US 6,641,720 B1

(12) United States Patent
Crompton et al.

(10) Patent No.: US 6,641,720 B1
(45) Date of Patent: *Nov. 4, 2003

(54) APPARATUS AND METHODS FOR SEPARATING SOLIDS FROM FLOWING LIQUIDS OR GASES

(76) Inventors: Stephen Crompton, 11 Sydney Street, Rye, Victoria 3941 (AU); Paul Blanche, 42 Wakool Avenue, Rosebud, Victoria 3939 (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/934,078

(22) Filed: Sep. 19, 1997

Related U.S. Application Data

(63) Continuation-in-part of application No. 08/750,706, filed as application No. PCT/AU95/00351 on Jun. 16, 1995, now Pat. No. 5,788,848, and a continuation-in-part of application No. 08/501,011, filed as application No. PCT/AU94/00061 on Feb. 11, 1994, now abandoned.

(30) Foreign Application Priority Data

Feb. 11, 1993 (AU) .......................................... PL7222/93
May 11, 1993 (AU) .......................................... PL8710/93
Jul. 19, 1993 (AU) .......................................... PL9990/93

(51) Int. Cl.[7] .................. B01D 29/35; B01D 35/22; B01D 36/04; E02B 5/08
(52) U.S. Cl. .................. 210/155; 210/162; 210/304; 210/305; 210/409; 210/512.1
(58) Field of Search ............... 210/154, 155, 210/156, 158, 159, 162, 163, 164, 409, 791, 304, 305, 306, 308, 309, 512.1, 804; 405/81, 82

(56) References Cited

U.S. PATENT DOCUMENTS

| 317,366 A | * | 5/1885 | Jaeger ........................ 210/162 |
| 419,887 A | * | 1/1890 | Robinson ..................... 210/162 |
| 454,185 A | * | 6/1891 | Robinson ..................... 210/162 |
| 636,747 A | * | 11/1899 | Blake .......................... 210/162 |
| 775,664 A | | 11/1904 | McVeety |
| 964,428 A | | 7/1910 | Johnson et al. |

(List continued on next page.)

FOREIGN PATENT DOCUMENTS

| AU | 628745 | 9/1992 | |
| AU | 61034/94 | 8/1994 | |
| DE | 1442417 | 11/1968 | |
| DE | 2743580 | 3/1979 | |
| DE | 27 43 580 | 3/1979 | ............. E03F/5/14 |

(List continued on next page.)

OTHER PUBLICATIONS

"Perry's Chemical Engineers' Handbook", 6th Ed., 17–56 Novel Separation Processes, New York, McGraw–Hill, 1984.
Memento Technique De L'eau, Edition du Cinquantenaire, 1989, Neuviéme édition, Tome 2, Section 5.1 "Tamis Pour Eaux Résiduaires".
Brochure, "Water Pollution . . . the environmental time-–bomb of the 90's".

(List continued on next page.)

*Primary Examiner*—Robert J. Popovics
(74) *Attorney, Agent, or Firm*—Fitzpatrick, Cella, Harper & Scinto

(57) ABSTRACT

A means separates solid matter from liquid and includes a perforated separation panel through which the liquid can pass and which prevents the passage of the solid matter of a size larger than a predetermined size. When solid matter becomes located against the panel, the flow of liquid along the face of the panel on which the solid matter is located will tend to cause the solid matter to move from the panel so that the panel is self cleaned and does not become obstructed by the solid matter.

27 Claims, 10 Drawing Sheets

U.S. PATENT DOCUMENTS

| | | | | |
|---|---|---|---|---|
| 1,100,435 A | | 6/1914 | Lance | |
| 1,153,186 A | * | 9/1915 | Bates | 210/162 |
| 1,178,428 A | * | 4/1916 | Tozier | 210/162 |
| 1,213,624 A | * | 1/1917 | Glenn | 210/162 |
| 1,451,394 A | * | 4/1923 | Hurst | 210/162 |
| 1,699,828 A | * | 1/1929 | Wycleoff | |
| 1,856,685 A | | 5/1932 | Anderson | |
| 1,861,031 A | * | 5/1932 | Schmitt | 210/162 |
| 1,897,195 A | | 2/1933 | Howden | |
| 2,039,692 A | | 5/1936 | Van Tongeren | |
| 2,071,975 A | | 2/1937 | Holm-Hansen et al. | |
| 2,087,789 A | | 7/1937 | Allardice | |
| 2,152,115 A | | 3/1939 | Van Tongeren | |
| 2,223,104 A | * | 11/1940 | Hansen | 210/354 |
| 2,357,734 A | | 9/1944 | Haber | |
| 2,568,032 A | | 9/1951 | Stephanoff | |
| 2,571,331 A | | 10/1951 | Blomen | |
| 2,788,087 A | | 4/1957 | Lenehan | |
| 2,827,169 A | | 3/1958 | Cusi | 209/397 |
| 2,913,114 A | | 11/1959 | Plaven | |
| 2,936,074 A | * | 5/1960 | Forshee | |
| 2,998,137 A | | 8/1961 | Vane | |
| 3,487,931 A | | 1/1970 | Paulson | 210/130 |
| 3,523,077 A | | 8/1970 | Camirand et al. | 210/739 |
| 3,792,573 A | | 2/1974 | Borsheim | 55/357 |
| 3,985,522 A | | 10/1976 | Kuhlmann | 55/52 |
| 4,003,836 A | | 1/1977 | Stearns et al. | |
| 4,081,374 A | * | 3/1978 | Forshee | 210/162 |
| 4,102,790 A | * | 7/1978 | Portyrata | |
| 4,108,778 A | * | 8/1978 | Lambert et al. | 210/297 |
| 4,198,220 A | | 4/1980 | Keller | |
| 4,221,667 A | | 9/1980 | Suhrheinrich | 210/304 |
| 4,349,436 A | | 9/1982 | Kaump | 210/104 |
| 4,415,462 A | * | 11/1983 | Finch et al. | 210/162 |
| 4,418,504 A | * | 12/1983 | Lassiter | 210/474 |
| 4,441,999 A | | 4/1984 | Frykhult | 210/354 |
| 4,467,570 A | * | 8/1984 | Kriegel | 52/12 |
| 4,476,021 A | | 10/1984 | Souza | 210/307 |
| 4,551,247 A | | 11/1985 | Borchert | |
| 4,584,003 A | | 4/1986 | Oda et al. | |
| 4,634,537 A | | 1/1987 | Schreiber | |
| 4,650,570 A | | 3/1987 | Fjällström | 209/250 |
| 4,678,589 A | | 7/1987 | Ayres, Jr. | 210/797 |
| 4,853,116 A | | 8/1989 | Wallander | 210/104 |
| 4,855,038 A | | 8/1989 | LeBlanc | 209/273 |
| 4,883,509 A | | 11/1989 | Giusti et al. | 55/326 |
| 4,956,101 A | * | 9/1990 | Holmberg | |
| 5,000,842 A | | 3/1991 | Ljokkoi | 209/273 |
| 5,034,122 A | * | 7/1991 | Wiesemann | 210/162 |
| 5,126,039 A | | 6/1992 | Silander | 209/270 |
| 5,271,191 A | * | 12/1993 | Vahamaki | 52/12 |
| 5,524,770 A | | 6/1996 | LeBlanc et al. | 209/273 |
| 5,543,038 A | * | 8/1996 | Johannessen | |
| 5,624,558 A | | 4/1997 | Aaltonen et al. | 210/415 |
| 5,674,386 A | * | 10/1997 | Filion | 210/162 |
| 5,770,057 A | * | 6/1998 | Filion | 210/162 |
| 5,779,888 A | * | 7/1998 | Bennett | 210/162 |
| 5,788,848 A | * | 8/1998 | Blanche et al. | 210/162 |
| 6,151,837 A | * | 11/2000 | Ealer, Sr. | 52/12 |
| 6,241,881 B1 | * | 6/2001 | Pezzaniti | 210/155 |

FOREIGN PATENT DOCUMENTS

| | | | | |
|---|---|---|---|---|
| DE | 8707094 | | 10/1987 | |
| DE | 9114607 | | 4/1992 | |
| DE | 4125419 A1 | * | 8/1992 | 210/162 |
| DE | 4211752 | | 10/1993 | |
| EP | 0098820 | | 1/1984 | |
| EP | 0 098 820 | | 1/1984 | E03F/5/14 |
| FR | 550484 | * | 3/1923 | 210/162 |
| FR | 26871 | * | 3/1924 | 210/162 |
| FR | 2520632 | | 8/1983 | |
| FR | 2691487 | | 11/1993 | |
| GB | 514273 | * | 11/1939 | 210/162 |
| GB | 1177176 | | 4/1966 | |
| GB | 1408003 | | 10/1975 | |
| GB | 2100150 | | 12/1982 | |
| JP | 59-18805 | | 1/1984 | |
| JP | 5918805 | | 1/1984 | E02B/5/08 |
| JP | 62-171719 | | 7/1987 | |
| NO | 304099 | | 10/1998 | |
| WO | 94/17896 | | 8/1984 | |
| WO | 86/07106 | | 12/1986 | |
| WO | 91/17811 | | 11/1991 | |
| WO | WO 93/01877 | | 2/1993 | |
| WO | WO 94/17896 | | 8/1998 | |

OTHER PUBLICATIONS

Brochure, "Storm King", H.I.L. Technology, Inc.

Brochure, "Vortechs Stormwater Treatment System", Vortechnics.

Brochure, "Double–Drum Screens", Lyco Manufacturing, Inc.

"Grant to keep the beaches cleaner", Government Officer (May 17, 1995), p. 25.

Weir, L. "New pollution device offers hope for rivers", The Advertiser (Jun. 7, 1995), p. 22.

Wong, T. "An Innovative Gross Pollutant Trap for Stormwater Treatment", Proc. Institution Engs., 2d Int'l Symp. Urban Stormwater Management, Australia (7/95), pp. 407–412.

"Local invention a world first", The Southern Peninsula Local, vol. 2, No. 16 (Oct. 17, 1995), cover, p. 13.

Gilchrist, G. "Now rubbish won't go with the flow", The Sydney Morning Herald (Nov. 8, 1995), p. 6.

Lake, T. "Hope for a cleaner Balmoral", Mosman Daily (Nov. 16, 1995), p. 5.

Strong, G. "Victoria ignores its own pollution beater", The Sunday Age News (Dec. 24, 1995), p. 4.

"Sifting through the rubbish", Mainstream, vol. 5 (Spring 1996).

Phelan, A. "'Snail' drains set the pace", The Northern Herald (May 23, 1996).

Thomas Register, pp. xx–yy (1990).

Gregory, P. "Sump cuts debris in runoff", NZ Herald, Section One (Jul. 11, 1996), p. 15.

"Cans, bottles, cups, bags surface in waste clean–up", Leader (Aug. 15, 1996).

"Risk Management Research Plan for Wet Weather Flows", National Risk Management Laboratory, U.S. E.P.A. (11/96).

Grant Amendment Application "Pilot–Scale Demonstration of the Continuous Deflection Separation Technology for SSO", U.S. E.P.A. (Sep. 9, 1996).

Wong, T. et al. "A Solid Separator Using a Continuous Deflective System", 7th Int'l Conf. Urban Stormwater Drainage, Germany (Sep. 9–13, 1996).

Winkler, T. "Street habits choke drains, study finds", The Age (Oct. 4, 1996) p. A7.

Allison, R. et al. "The Pollutec Stormwater Pollution Trap: Field Trials", Water (11–12/96), pp. 29–33.

"Proposal for Lake Merritt Watershed Stormwater Pollution Reduction Program", submitted by City of Oakland, Office of Public Works (1997).

Perry's Chemical Engineers' Handbook, Sixth Ed., 17–56 and 17–57, McGraw–Hill Book Co., NY.

* cited by examiner

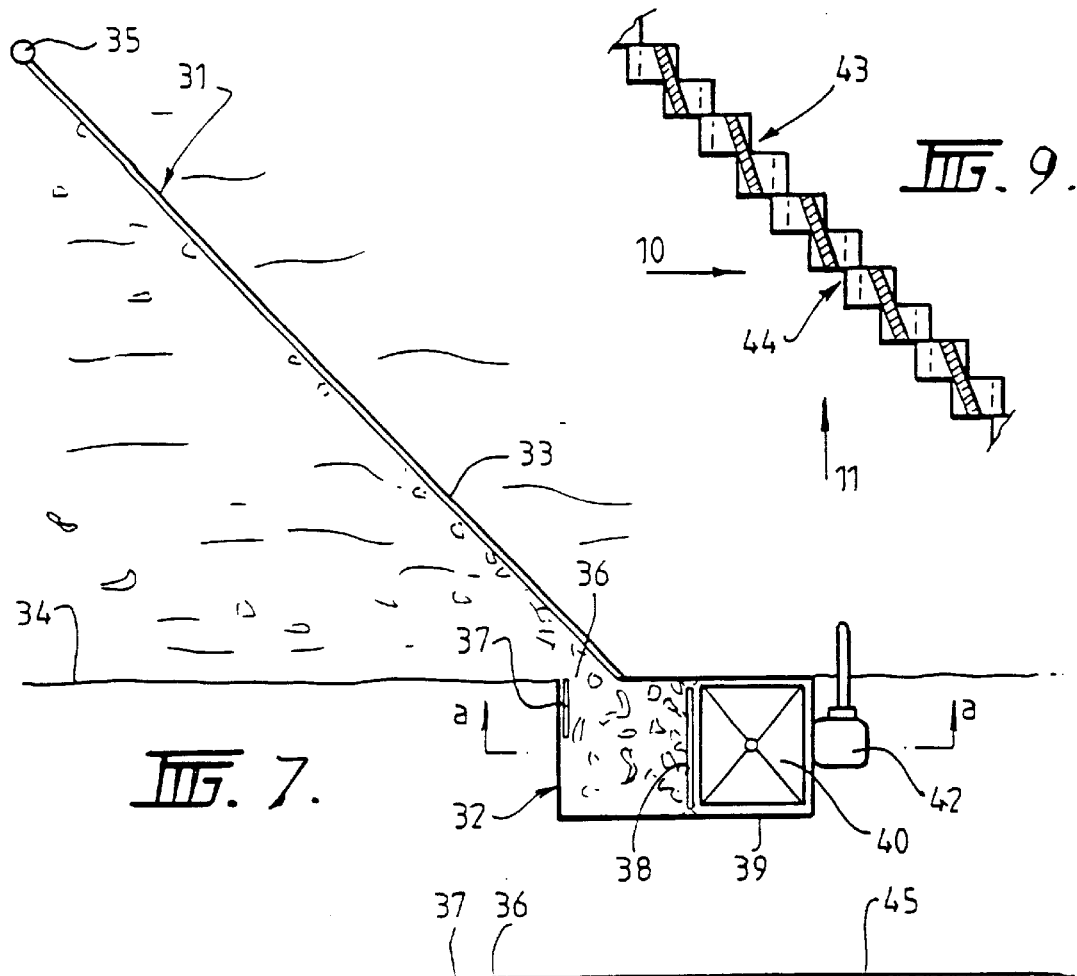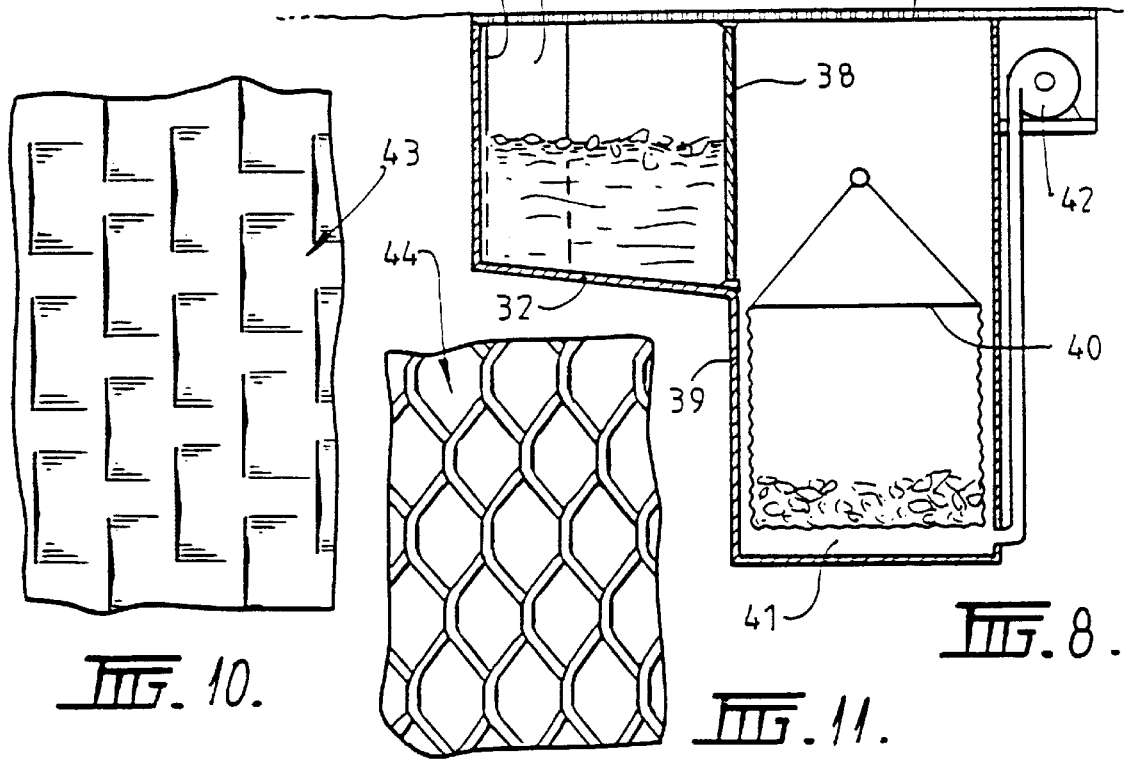

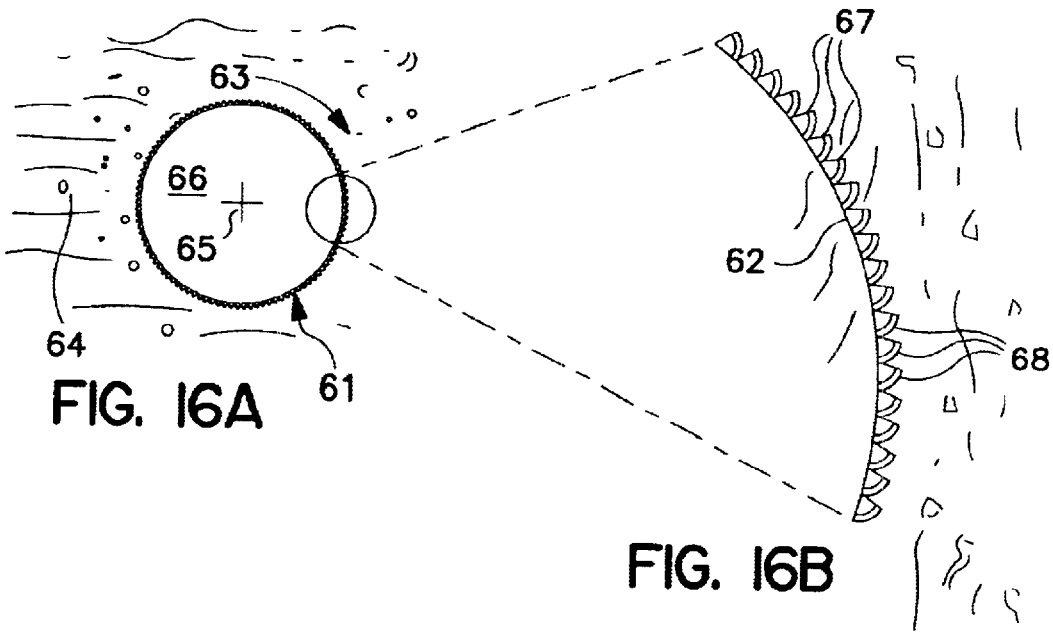
FIG. 16A
FIG. 16B
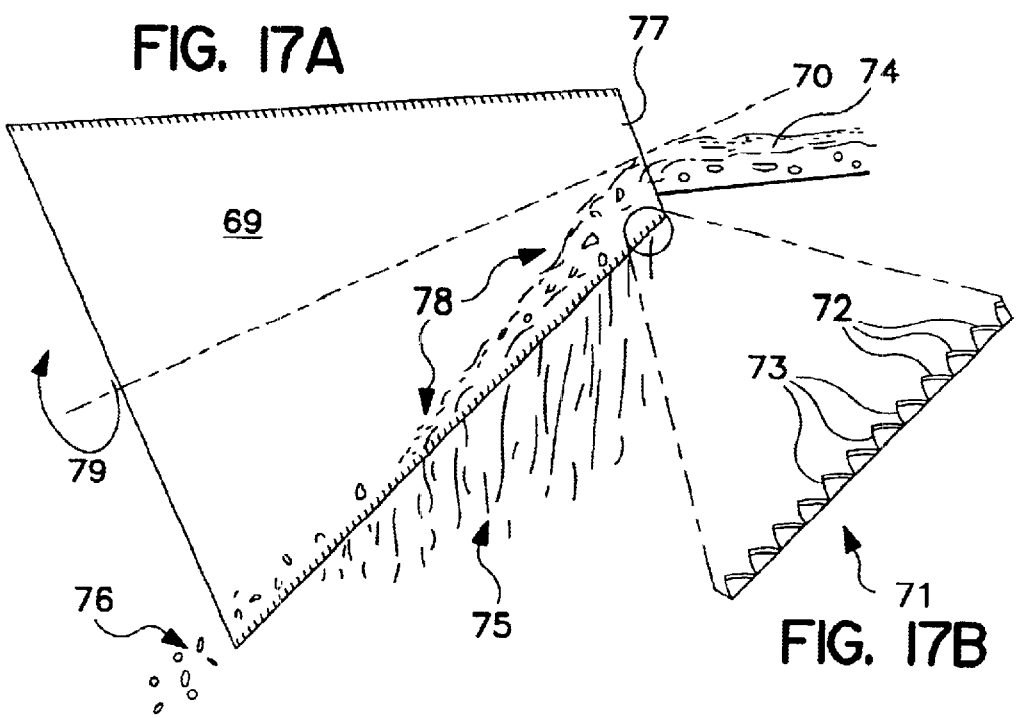
FIG. 17A
FIG. 17B

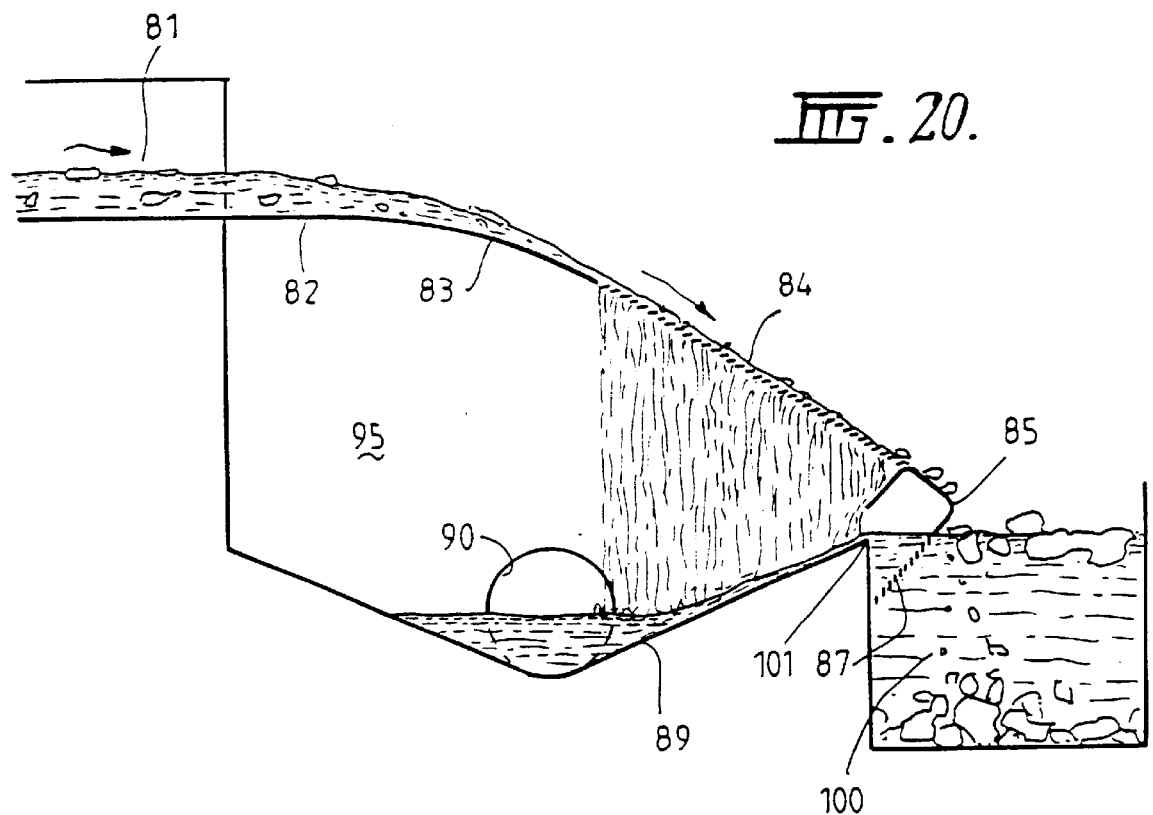
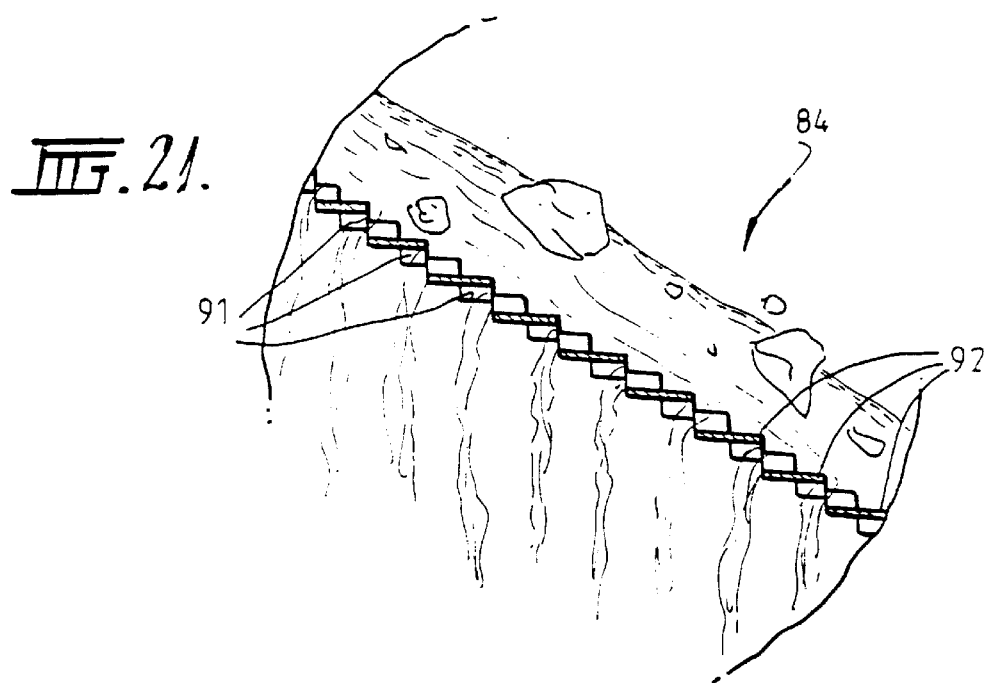

APPARATUS AND METHODS FOR SEPARATING SOLIDS FROM FLOWING LIQUIDS OR GASES

CROSS-REFERENCE TO RELATED APPLICATIONS

This application is a continuation-in-part of U.S. patent application Ser. No. 08/501,011, filed on Dec. 6, 1995, now abandoned, and U.S. patent application Ser. No. 08/750,706, filed on Mar. 24, 1997, now U.S. Pat. No. 5,788,848, issued Aug. 4, 1998. U.S. patent application Ser. No. 08/501,011 is a National Stage filing under 35 U.S.C. § 371 of International Application No. PCT/AU94/00061, filed Feb. 11, 1994, and U.S. Pat. application Ser. No. 08/750,706 is a National Stage filing under 35 U.S.C. § 371 of International Application No. PCT/AU95/00351, filed Jun. 16, 1995.

FIELD OF THE INVENTION

This invention relates to methods of and apparatus for separating floating and suspended solids from a flowing liquid using continuous deflective separation, and particularly, but not solely to non-mechanical methods and apparatus.

More generally, the invention relates to apparatus and methods for separating solids or particulate matter from flowing liquids or gases. The invention has particular, although not exclusive, application to the filtration of floating and entrained solids from discharges of water. One particular application of the invention is in relation to storm water drain technology. There are many applications where it is desirable to separate solids from a flowing liquid including:

1. Separation of solids from stormwater.

In many areas of the world, stormwater is directed to waterways and seas. Stormwater is a major carrier of solid pollutants such as plastics, cans, tree branches and animal faeces, amongst other things to waterways and seas.

Endeavours have been made to limit the passage of at least some of these materials, one method used is by having grates across outlets from the drains but these have generally been unsatisfactory because the size of the grate must be such as to enable water to pass even if material is held against the grate by water pressure so it has been necessary that the grate be of substantial opening size. Also, even such grates can be blocked and it is essential to provide a flow path around or over the grate to prevent build up of water upstream in the drain system. A second alternative proposed has been the use of systems, such as cyclones and dynamic separators, to remove the waste. Whilst these can be efficient, they are too expensive to be used in the whole of a stormwater system.

2. Separation of liquid from sewage.

A major difficulty with many sewage plants is the sheer volume of liquid to be handled. This is aggravated where a "mixed" system, that is a system which carries both sewage and storm water is used. In many cases, sewage plants could handle more sewage if the quantity of liquid delivered therewith could be reduced, if, for example, liquid was removed from sewage before it enters trunk sewers. To date, this has not been considered feasible.

Also, there are regions where stormwater and sewage are received by the same system. This can cause difficulties where there are heavy rains which overload the system, as it is undesirable to permit raw sewage to pass to overflow.

3. Removal of pollutants from industrial wastes.

Many industrial plants must pay prohibitive rates to discharge polluted liquids into sewers. It would be most desirable to separate a part of the pollution before the waste is delivered to sewers and this would provide economies both to the plant and to the authority if this cost of the early removal of polluted matter was less than the cost, of cleaning up pollution later.

4. Separation of solids from liquid in industrial applications including food processing.

In our International Patent Application number PCT/AU94/00061, we disclosed and claimed apparatus and methods for separating solids from flowing liquids. We believe that the apparatus and methods disclosed in that application provide very good results in applications requiring the separation of solids from flowing liquids. We have now developed improvements and/or refinements to the invention disclosed in that application, which we believe provide even better results than those disclosed in our earlier application.

SUMMARY OF THE INVENTION

The principal object of the invention is to provide non-mechanical methods of and apparatus for separating floating and suspended solids from flowing liquids.

The invention, in a broad sense, comprises a means for the separation of solid matter from a liquid including a perforated separation panel through which the liquid is adapted to pass and which prevents the passage of the solid matter of a size larger than a predetermined size characterised in that when solid matter becomes located against the panel, the flow of liquid along the face of the panel on which the solid matter is located will tend to cause it to move from the panel so that the panel is self cleaned and does not become obstructed by the solid matter.

In a specific aspect, the invention provides a non-mechanical method for separating solids from a flowing liquid by utilising the energy of the flowing liquid on the inlet side, a separation panel in the path of the fluid flow and so arranged that the liquid is deflected thereby, which deflection causing larger suspended solids to a collection sump or the like. At the same time, the liquid flow across the separation panel prevents the panel from clogging. Liquid containing some finer suspended solids can pass through the panel to the outlet side. Floating solids are retained in the collection sump behind a flow direction baffle and can be prevented from inadvertent delivery during high flow conditions by a high level baffle located adjacent the top of the separation panel.

The invention also provides an apparatus for the separation of solids from a flowing liquid which apparatus has an inlet and an outlet for the liquid, a separation panel in the path of flow between the inlet and the outlet, the panel presenting a closed face in the direction of flow but apertures therethrough at an angle thereto, liquid being able to pass through the apertures whereas solids are caused to pass over the face thereof.

The arrangement is such that even solids smaller than the size of the apertures can be caused to move past the apertures either because of the inertia of the solids, or the action of gravity, or both.

In this specification, where we refer to water flow, this is intended to include relative water flow and thus there can be circumstances where the separation plate is moving as well as, or instead of, the water.

In a broader aspect, the present invention provides an apparatus for separating solid or particulate matter from a flowing liquid or gas, the apparatus including:

a separation panel positioned in the path of flow of the liquid or gas, the separation panel including a plurality of openings, wherein the openings are of a predetermined size such that only solid or particulate matter smaller than that size is able to pass through the openings, and wherein further, the configuration and arrangement of the openings on the separation panel is such that in use of the apparatus, solid or particulate matter larger than the predetermined size is substantially prevented from adhering to or obstructing the separation panel.

Preferably, the arrangement of the openings in the separation panel is such that, in use of the apparatus, the openings are disposed at an angle relative to the direction of flow of the liquid or gas.

Preferably further, the configuration of the openings is such that each opening includes a deflection means generally opposed to the direction of flow of the liquid or gas, to assist in deflecting solid or particulate matter entrained in the flow, away from the openings.

In a preferred form of the invention, the separation panel takes the form of a curved structure.

It is particularly preferred that the apparatus includes a generally cylindrical separation panel. It is particularly preferred that the separation panel is in the form of an open ended generally cylindrical structure. In this preferred form of the invention, it is also preferred that the separation panel forms part of a larger separation chamber, into which, in use of the apparatus, the liquid or gas flow is introduced by an inlet means, so as to establish a circular flow of the liquid or gas within the separation panel. This circular flow enables solids or particulate matter of a predetermined size entrained in the liquid or gas, to be trapped and to circulate within the confines of the separation panel. The circular motion of the flowing liquid or gas within the separation panel also results in the entrained solids or particulate matter generally not adhering to the separation panel, but being entrained in the circular motion of the liquid or gas. In this way, the establishment of a circular flow motion of the gas or liquid within the separation panel is such as to enable the separation panel to act as a generally self-cleaning filter for the solid or particulate matter entrained within the flowing liquid or gas. The fact that the liquid or gas is able to pass freely through the openings in the separation panel means that the panel is able to filter solid or particulate matter of a predetermined size from the flowing liquid or gas, thereby enabling the liquid or gas to be discharged to an outlet means, at least substantially filtered of the solid or particulate matter.

It is also preferred that the configuration of the apparatus is such that in use, the flow of the liquid or gas outside the confines of the separation panel is in a direction opposite to the direction of flow of the liquid or gas within the confines of the separation panel. Such a configuration assists in maintaining the self-cleaning function of the separation panel, in use of the apparatus.

Preferably, the apparatus also includes means for facilitating the collection of the solid or particulate matter into a receptacle, from which it may be removed. In some embodiments of the invention, gravitational forces may combine with the circular motion of the gas or liquid within the cylindrical separation panel, so as generally to encourage the deposition of the solid or particulate matter into a receptacle which may be positioned generally below and/or above the separation panel, depending upon the specific gravity of the solid or particulate matter. In the case of solids or particulate matter having a lower specific gravity than the liquid or gas, they will tend to float on the surface of the liquid or gas, in which case, they can be collected by a receptacle generally disposed above the separation panel. In the case of solids or particulate matter having a higher specific gravity than the liquid or gas, they will tend to settle under the action of gravitational forces, in which case, a receptacle to capture them will generally be positioned below the separation panel.

The apparatus may also include mechanical means to assist the deposition of the solid or particulate matter in the receptacle, through the action of gravity. Such means could take any number of forms, but would include, for example, providing the receptacle with a baffle or flange directed downwardly to encourage the deposition of settleable solid or particulate matter.

The invention also provides a method for separating solid or particulate matter from a flowing liquid or gas, the method including the steps of:

positioning a separation apparatus in the path of flow of the liquid or gas; and providing the separation apparatus with a separation panel having a plurality of openings therethrough, wherein the openings are of a predetermined size such that only solid or particulate matter smaller than that size is able to pass through the openings, and wherein further, the configuration and arrangement of the openings on the separation panel is such that in use of the apparatus, solid or particulate matter larger than the predetermined size is substantially prevented from adhering to, or obstructing the separation panel.

Preferably further, in the method, the arrangement of the openings is such that, in use of the apparatus, the openings are disposed at an angle relative to the direction of flow of the liquid or gas.

It is also preferred, in the method, that each of the openings includes a deflection means generally opposed to the direction of flow of the liquid or gas, to assist in deflecting solid or particulate matter entrained in the flow, away from the opening.

Preferably, in the method described above, the separation panel takes the form of a curved structure.

Preferably further, in the method described above, the separation panel takes the form of a generally cylindrical structure, and the separation apparatus includes inlet and outlet means for directing the flow of the liquid or gas into, and out of, the separation apparatus respectively. It is particularly preferred that the separation panel is an open ended generally cylindrical structure.

It is particularly preferred in the said method, that the arrangement is such that the liquid or gas is introduced into the separation apparatus via the inlet means and presented to a separation chamber which includes a generally cylindrical separation panel, so that a circular motion of the liquid or gas is established within the confines of the separation panel, so as generally to trap solid or particulate matter of a predetermined size within the separation panel, yet at the same time, permit the liquid or gas to pass therethrough freely, and so that the separation panel is continually cleaned by the circular motion of the liquid or gas within it.

Preferably further, in the method, the configuration of the apparatus is such that in use, the flow of the liquid or gas outside the confines of the separation panel is in a direction opposite to the direction of flow of the liquid or gas within the confines of the separation panel, so as to assist in maintaining the self-cleaning function of the separation panel, in use of the apparatus.

Preferably further, the method also includes the step of providing means to facilitate the collection of the solid or particulate matter separated by the method, from the flowing liquid or gas. Such means could, for example, utilise the assistance of gravitational forces, to assist in the collection of the solid or particulate matter.

Preferably further, the method also includes means for facilitating the removal from the separation apparatus, of solids or particulate matter separated from the flowing liquid or gas.

In order that the invention may be more readily understood, reference will be made to the accompanying drawings, which show certain examples of the invention.

BRIEF DESCRIPTION OF THE DRAWINGS:

FIG. 7 shows an example of an installation in a channel or river of separation panels for the removal of solids from a flowing liquid and subsequent collection and storage;

FIG. 8 shows an enlarged section a—a through the holding chambers;

FIG. 9 shows as enlarged horizontal section through the separation panel;

FIG. 10 shows an enlarged elevation of the separation panel viewed in the direction of flow of the channel in FIG. 9 at view "10" with the openings substantially closed to view;

FIG. 11 shows an enlarged elevation of the separation panel from the angle giving maximum open space, in FIG. 9 at view "11";

FIGS. 16A and 16B show a cylinder driven mechanically in a direction opposed to the protruding deflective segments of the separation apparatus causing deflection of particulant matter away form the device while allowing liquid to pass through via the openings;

FIGS. 17A and 17B show a mechanically driven apparatus with internal deflective segments and openings;

FIG. 20 shows a longitudinal vertical section through another example of this invention which has a water filled solids collection sump;

FIG. 21 shows an enlarged detail of the section through the upper separation panel of FIG. 20;

DETAILED DESCRIPTION OF PREFERRED EMBODIMENTS

Figure 1:
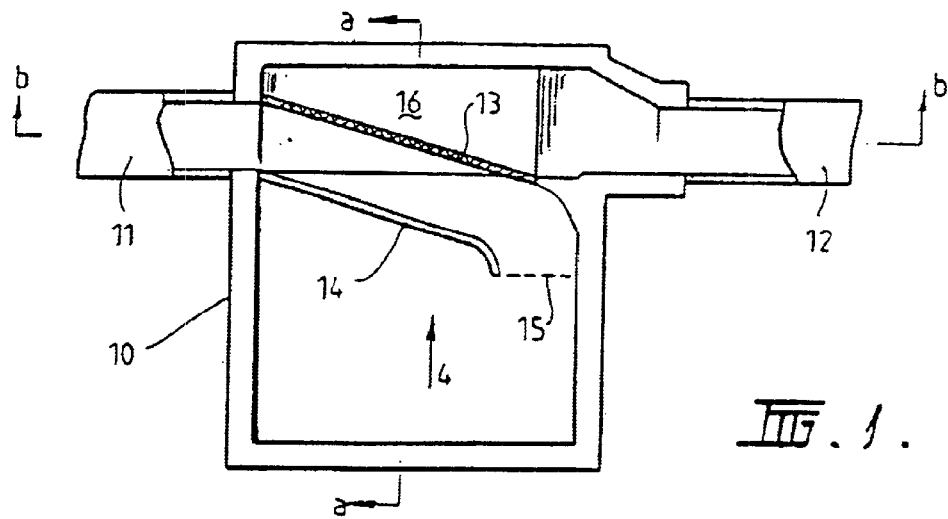
FIG. 1 is a plan view through-one example of a separator made in accordance with the invention.
Figures 2, 4:
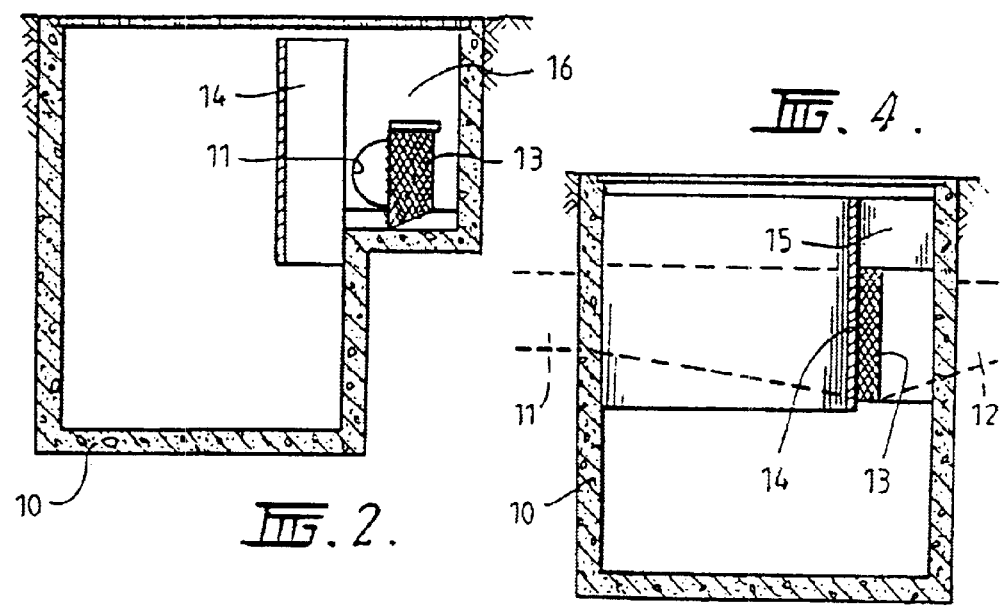
FIG. 2 is a vertical section along line a—a of FIG. 1.
FIG. 4 is a view along arrow 11411 of FIG. 1.
Figure 3:
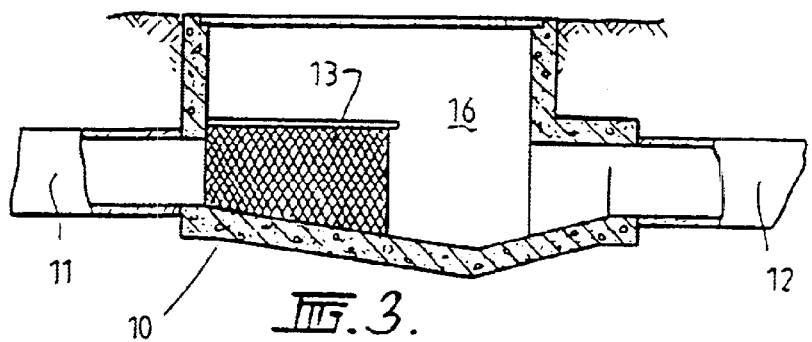
FIG. 3 is a vertical section along line b—b of FIG. 1.

Referring first to FIGS. 1 to 4 we illustrate an apparatus which is a gross pollutant trap placed in line in, say, a stormwater drain.

Before describing this in detail, the invention is equally applicable to major applications, such as in open channels, feeders or trunk stormwater drains or can be used in smaller applications such as in car parks. In the first type of application, the apparatus can be cast in situ or could be fabricated from pre-cast components, and in the second could be of a pre-cast construction.

The type of apparatus illustrated in FIGS. 1 to 4 can be considered a larger construction and, in this case, the apparatus can be retrofitted into a stormwater system and preferably in an area which gives reasonable access.

The apparatus has a containment sump 10 which, as shown, is contiguous with a separation chamber 16. The sump 10 is located beside the original position of the stormwater drain, which is broken to provide an inlet 11 into and an outlet 12 from the separation chamber. As the sump has to be cleaned at intervals, the size of the sump is such as to give a required interval between cleaning and to allow recirculation of liquid into the separation chamber. It can vary in form and dimensions to suit specific site and project requirements.

The separation chamber has the separation panel 13 which is preferably a stainless steel plate, as will be described hereinafter, and which acts to separate the inlet 11 from the outlet 12. Parallel to the separation panel there may be a containment and flow direction baffle 14 which can be basically parallel to and spaced from the separation panel. This baffle 14 must be arranged to allow recirculation and may preferably extend from the top of the chamber to contain floatables and to below the bottom of the separation plate to permit recirculation.

A high level baffle 15 can be provided to retain floatables during extreme conditions.

As illustrated, the separation panel 13 is perforated but is formed so that it presents to the incoming liquid a closed face. As can be seen from FIG. 6, the panel can be deformed so that there are a number of surfaces 20 which are directed towards the flow and which have therebehind a number of apertures 21, which pass through the panel. A formation such as this is possessed by expanded mesh.

There are other ways in which the separation panel may be formed, including the use of a series of bars or flat rods which are located to provide a closed face to the flow but with apertures located behind and between these.

It is preferred, in this and the other embodiments to be described that the closed face, as a whole, presents a positive angle to the flow of liquid. The preferred angle will vary with different applications of the invention and can be close to being directly across the flow to being substantially parallel to the flow.

On liquid entering through the inlet, the sump 10 is first filled and then the liquid is then caused to move along the separation panel 13, and is constrained to this movement by the containment and flow direction baffle 14.

As there is effectively an hydraulic head between the inlet 11 and the outlet 12, whilst there will be movement of the liquid and any entrained solid material along the panel 13, there will be movement of liquid through the apertures 21, to the outlet 12. The solid material will, if it strikes the panel, tend to move along the panel by the forward momentum of the liquid and down the panel, by gravity. Should solid material larger than the apertures strike the surface, the forward movement of the liquid provides a self-cleaning of the surface of the panel so there is little or no tendency for blockage. The apparatus can thus be left for substantial periods with confidence that the panel will not become blocked, it only being necessary that the sump is cleaned at intervals before it is over-filled with solid material.

Because of the form of movement, we have found the arrangement such that not only is all solid material larger than the apertures in the panel retained, but much that is smaller.

The sold material is carried through to the sump where it tends to drop under gravity and whilst some material, particularly light material, can be moved past the separation panel more than once. The liquid which enters the sump tends to move in an arcuate manner and most of the material falls into the sump after its first movement therethrough and before it is again passed along the face of the separation panel.

Floatables will also be held in the sump. However if upstream control of floatables, say by the provision of similar apparatus at major sources such as take away food outlet carparks, is good, there may not be great quantities of floatables to be retained.

In order to maintain the apparatus, it is only necessary to empty the sump 10 at intervals to prevent excessive build up of solid matter in the sump.

Under extreme conditions, say flood or near flood conditions, it will be seen that the apparatus of the invention will not act as a source of difficulties. The apparatus can be so designed as to carry as much liquid as the inlet stormwater drain.

If, say because of poor maintenance and the build up of solid in the sump, an overflow can be provided over the top of the separation plate. For these conditions, we provide the high level baffle 15 which extends from just below the top of the separation plate to the top of the flow diverter baffle and acts to retain floatables.

Figure 5:
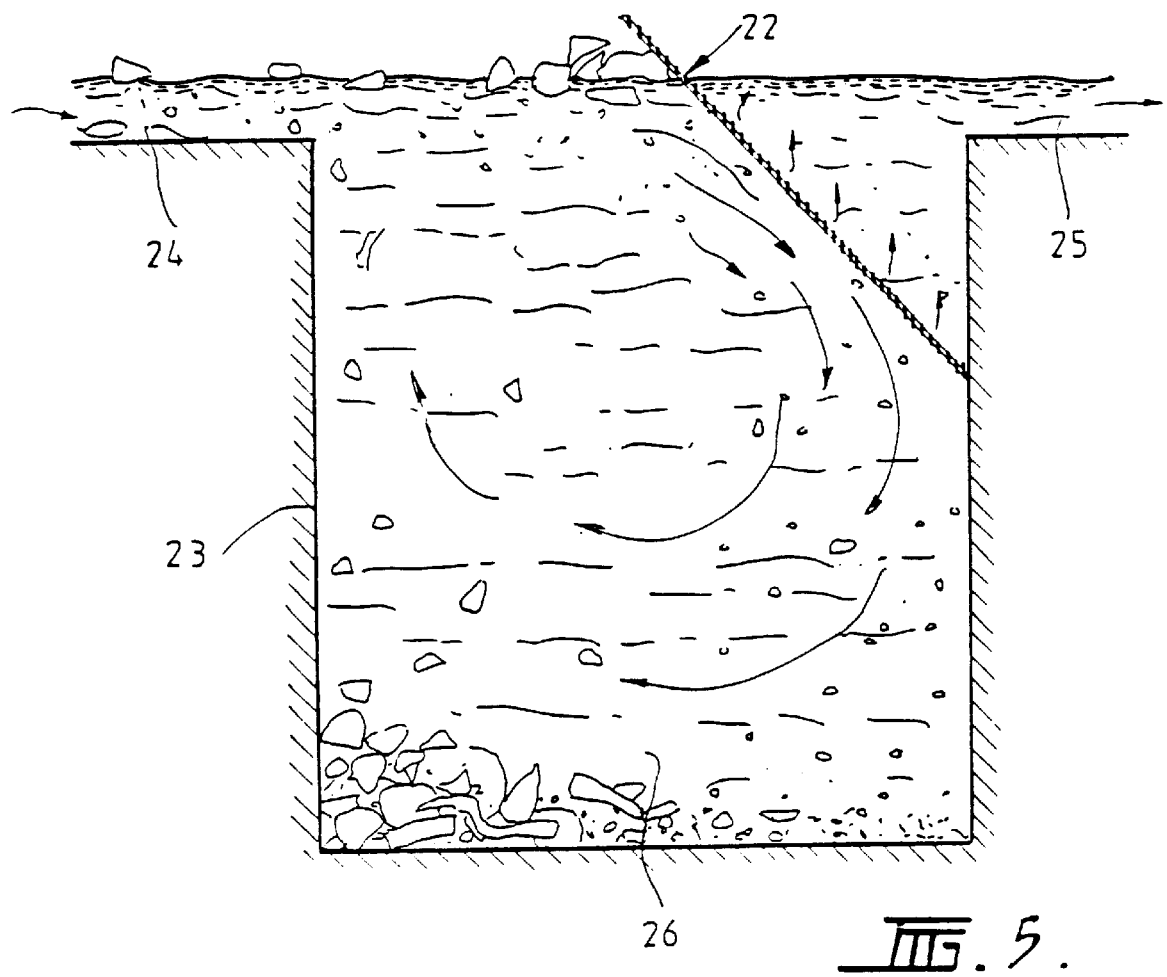
FIG. 5 shows a vertical section through a second example of a separator according to this invention.
Figure 6:
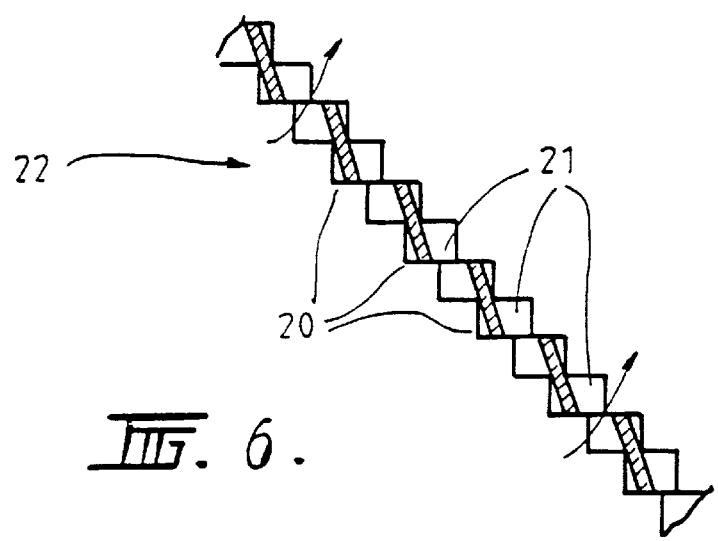
FIG. 6 shows an enlarged detail of the vertical section through the separation panel.
Figure 12:
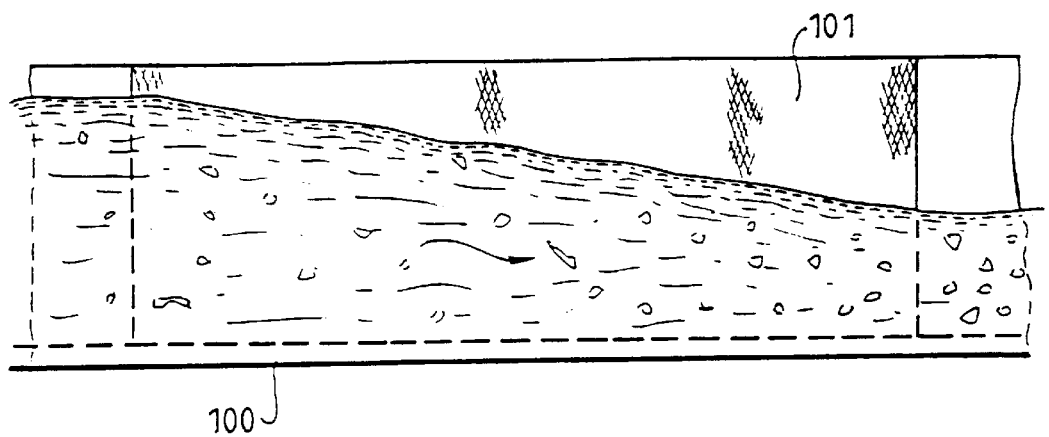
FIG. 12 shows a side elevation view of a system which can remove water from sewage whilst permitting the solid matter to proceed, and is a view along line 12—12 of FIG. 13.

Referring now to FIGS. 5 and 6, we illustrate a simple construction which utilises the invention and can be used in open channels or the like.

The liquid containing suspended and floating solids enters through inlet 24 into the separation chamber 23. The chamber is divided into inlet and outlet sides by a separation panel 22 fixed at the lower edge to the outlet side of the chamber 23, and inclined at an angle towards the inlet 24. Again the panel 22 presents a closed surface to the incoming liquid but, as described in relation to the previous embodiment, liquid can pass through the panel 22 and to the outlet 25.

The panel 22, the sides of the inlet 24 and the inlet sides of the chamber 23 extend to a height above surface sufficient to prevent any floating solids from crossing over to the outlet side of the chamber 23.

The panel 22 can be skewed to one side to aid the movement of floatable materials off to the side and away from the panel.

Again, as previously discussed, the separation panel 22 is constructed with a series of segments 20 which are angled when the panel is in its required orientation and thus provide a substantially solid face opposing the liquid flow and a corresponding series of substantially horizontal openings 21 that allow the liquid to pass up and through the panel 22 to the outlet side of the chamber 23 and thence to the outlet 25.

The substantially horizontal orientation of the openings 21 in the panel 22, combined with the general downward liquid flow over the inlet side of the panel, discourages clogging and blocking of the openings by the suspended solids. A large portion of the kinetic energy of the suspended solids is dissipated as they are deflected and forced down at the panel causing them to settle down to the collection sump 26 at the bottom of the chamber 23. These solids can also be caused to move to the side as well as down.

The collected solids are removed periodically by manual or mechanical means.

Referring now to the embodiment of FIGS. 7 to 11. This embodiment shows use of the invention as a boom or the like extending across a waterway or channel. The separation panel 31, which can be in one piece or made up of overlapping segments, is placed in the flowing liquid at an angle so as to deflect suspended and floating solids to the side collection chamber 32. The panel 31 preferably extends far enough below surface level to catch floating and near-surface suspended solids. It can, in the case of a channel or river installation as shown in FIG. 6, be supported by a tensioned cable 33 anchored to the bank 34 at one end and to a substantial pylon 35 set in the channel, at the other end. It may be continuous across the width of the river or as shown in FIG. 6 only project part way across, being placed at a strategic location near a bend to maximise the amount of solids caught.

The collection chamber 32 has an opening 36 to the channel which although normally being open, is periodically closed by a mechanical operated door 87 to prevent further ingress of liquid and solids when this door 37 is closed, the mechanically operated door 38 to the stockpiling chamber 39 is opened, allowing all the liquid and solids from the collection chamber 32 to enter. When the collection chamber 32 is empty, the door 38 to the stockpiling chamber 39 is closed and the door 37 to the channel is opened again allowing ingress of liquid and solids to the collection chamber 32.

The stockpiling chamber 39 contains a removable basket 40 open at the top made of similar material to the separation panel, thus allowing the liquid to pass through the basket to the lower part 41 of the stockpiling chamber from whence it is removed and discharged to the channel by mechanical means such as a pump 42. Solids are retained in the basket 40 which can be removed and emptied periodically. Both chambers are covered by removable lids 45.

The separation panel 31 in this example is an expanded metal stainless steel plate placed in a substantially vertical plane and angled to the direction of flow so that the solid segments 43, FIG. 9, form a substantially closed face when viewed from the direction of flow causing solids to be deflected along the direction of the panel 31. The liquid passes freely through the openings 44, FIG. 11, in the panel and continues, unimpeded by the panel 31, in the flow.

FIGS. 12 to 15 show a system whereby liquid can be removed from sewage so that the sewage, together with enough liquid to act as an effective carrier thereof can be passed to a main sewer, possibly through a pumping station, and the liquid can be passed to a treatment plant whereby it can be treated either to a stage in which it can be used, for example, for watering or even to a stage in which it become potable.

It will be appreciated that the capacity of sewers and treatment plants are limited by the amount of liquid passing therethrough or thereinto. If the amount of liquid can be restricted, this will enable effectively greater capacities than would otherwise be the case.

Sewage is often passed through pumping stations and if there is to be separation of the liquid from the solid material, it is necessary that such separation occurs before any pumping which tends to homogenise the material.

The system of FIGS. 12 to 15 includes a channel 100 which carries the liquid/solid mixture and on one side of this there is a separation panel 101 which can have the same properties of the panels described earlier herein.

On the side of the panel 101 away from the channel 100 there is a liquid receiving area 102 which has an outer wall 103.

The outer wall 103 defines the volume of material which can pass through the screen and the tapering shape aids in the maintenance of similar surface gradients on each side of the plate 101.

Figure 13:
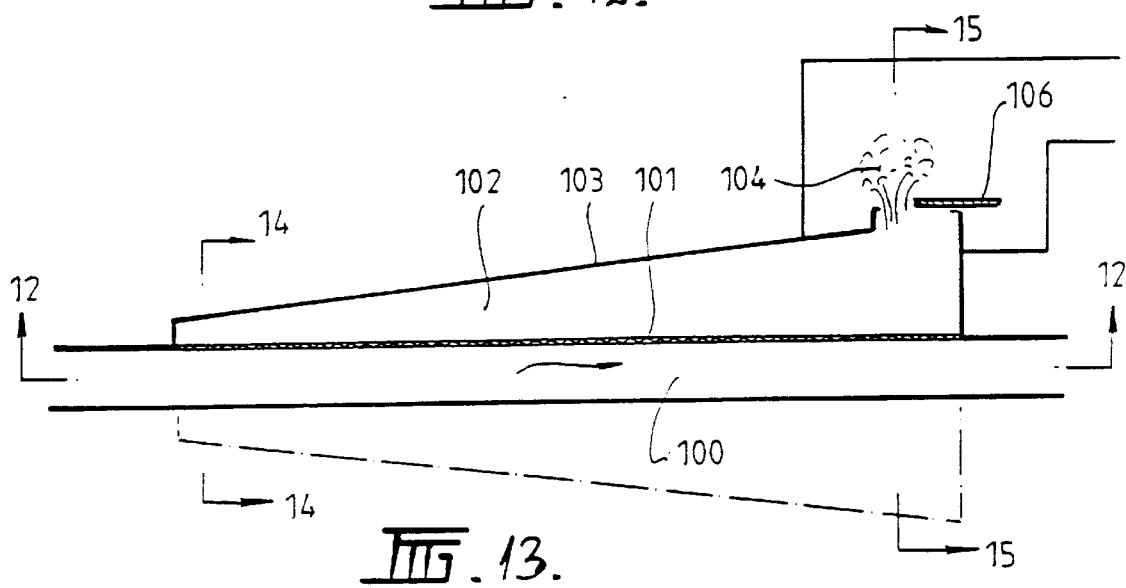
FIG. 13 shows a plan view of the system of FIG. 12.
Figure 14:
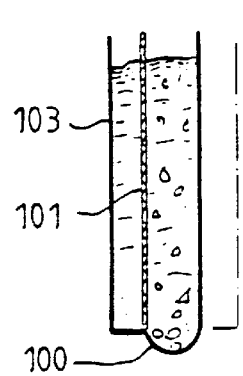
FIG. 14 is a view along line 14—14 of FIG. 13.
Figure 15:
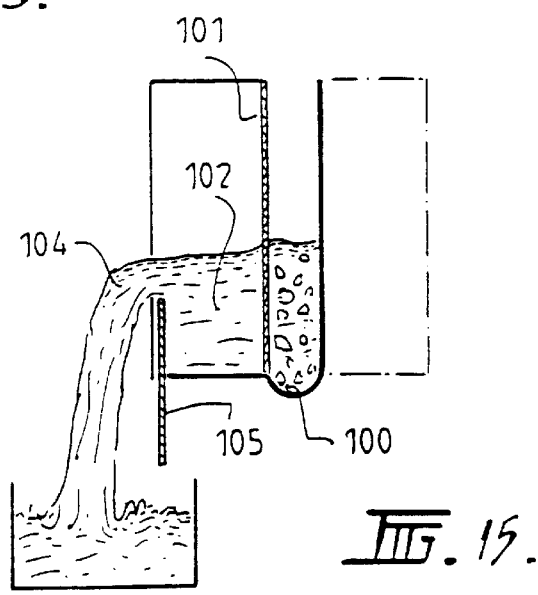
FIG. 15 is a view along line 15—15 of FIG. 13.
Figure 18:
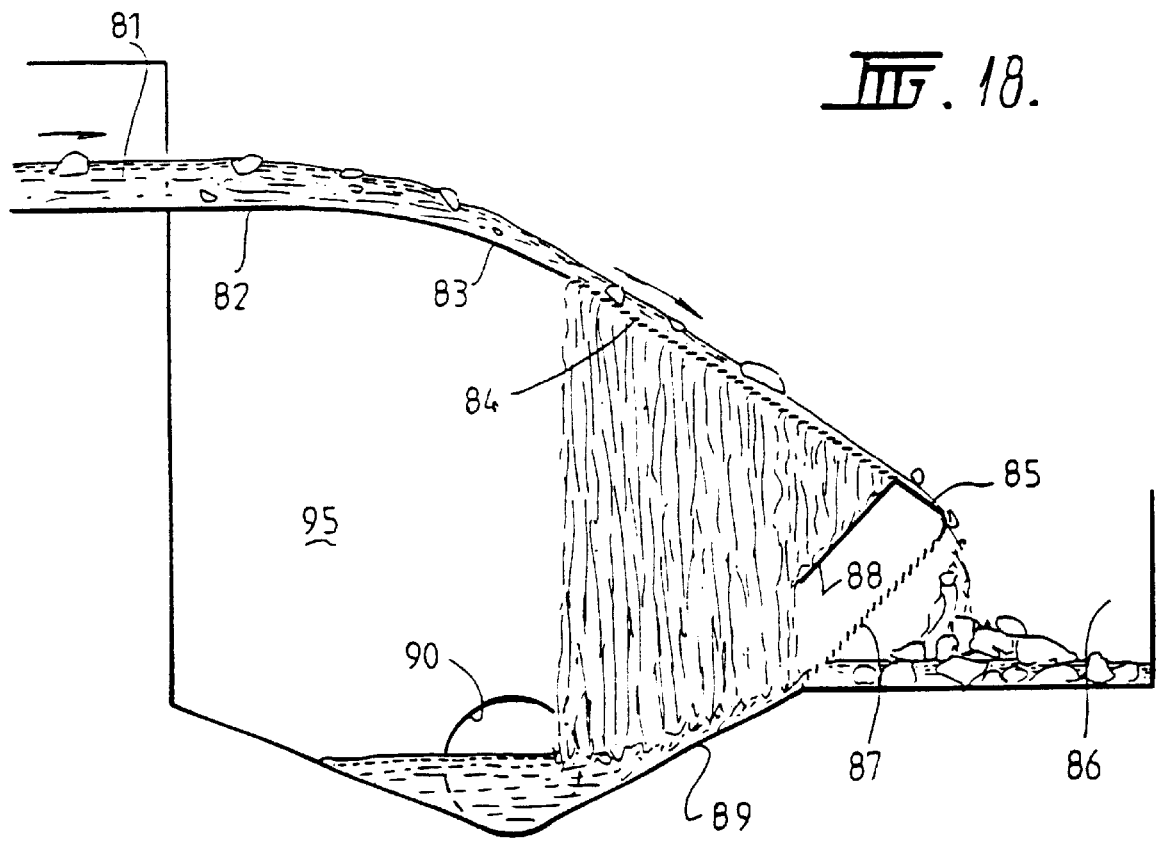
FIG. 18 shows a longitudinal-vertical section through a further embodiment of the invention.
Figure 19:
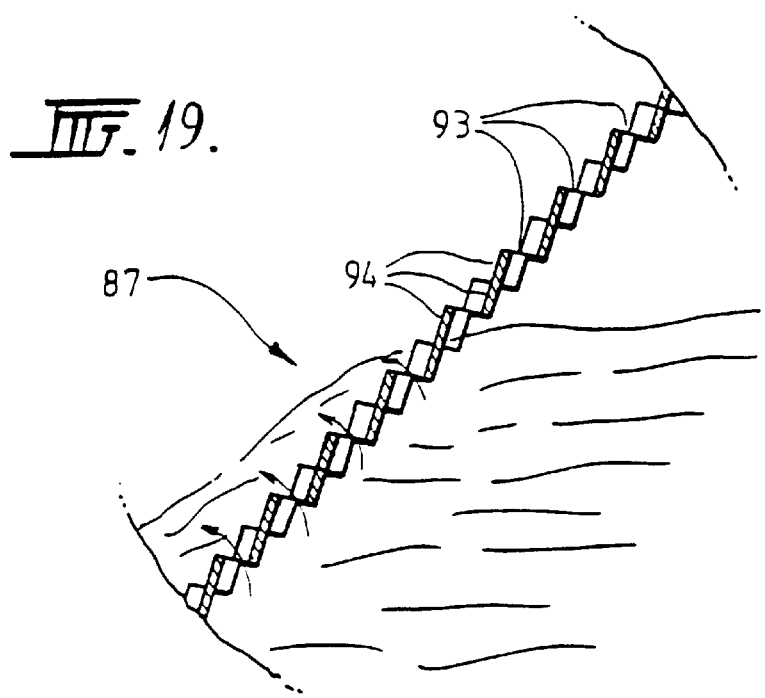
FIG. 19 shows an enlarged detail of the section through the lower separation panel of FIG. 18.

If the volume of flow is sufficient, it may be desirable to have separation panels on each side of the channel and the location of the other separation panel and its receiving area and wall are illustrated in broken line in FIG. 13.

The outer wall has an outlet 104 which may be closed by gates 105 and 106. The gate 105 effectively controls the head in the channel 100 as liquid will pass through the plate 101 and reach the level of the top of the gate 105 before any liquid is passed to the outlet 104. The gate 106 aids in the control of the size of the outlet and thus the characteristics of the flow. Specifically, this can control the effective head and thus ensures that the flow though the channel is such as to ensure that the screen 101 is self cleaning.

Referring now to FIG. 16, the apparatus 61 is placed in liquid 64 containing particulate matter and rotated as shown at 63 in a direction so as to produce relative movement and deflection by the protruding segments 68 while allowing liquid to pass through the surface 62 of the apparatus by way of the openings 67. Liquid is removed from inside the cylinder 66. The apparatus is rotated about its centre 65.

It may be preferred that the liquid 64 is also be caused to move relative to the apparatus to obtain the best operation.

Referring to FIG. 17, the apparatus 69 has a conical shape and rotated at its axis 70 at an angle downward showing the openings 73 to be closed to a perpendicular view from the inside of the apparatus 69. Liquid containing particulate matter 74 enters at the smaller opening 77 and passes over the inside surface of the apparatus 78. The protruding deflective segments 72 as shown in detail 71 cause particulate matter to pass down along the inside surface of the apparatus and exit at the larger opening 76 while liquid is able to pass around the deflective segments 72 through the openings 73 and downward away from the apparatus 75. This process is aided by its rotation 79.

Referring to FIGS. 18 to 21, we provide an apparatus which, whilst using the principle of the invention, highlights the effect of gravity on liquid movement through the separation panel.

In this embodiment, the liquid/solid mixture enters through the inlet 81 into the upper part of the inlet side of the separation chamber 95, passing over a substantially horizontal spreader plate 82 to allow the flow from the restricted inlet 81 to spread out towards the sides of the chamber. It then passes over the direction plate 83 which is curved to further spread the flow to the width of the chamber and direct the flow towards the upper separation panel 84. The spreader plate 82 and the upper separation panel 84 are substantially tangential to the curved flow plate 83 at its top and bottom edges respectively.

In this example of the invention the separation panel 84 is made from expanded metal sheets. The openings 91 in the panel are individually in a substantially vertical plane while the connecting solid segments 92 have a positive downward slope in the direction of flow. They form a series of small downward sloping steps over which the larger solids are directed, by the action of gravity and force of the flowing liquid, to the solids collection sump 86 at the base of the panel 84. There may be a solids straight or curved transition panel 85 at the base of the separation panel 84 to aid in clearing the panel of certain types of solids.

The layer of liquid closest to the separation panel 84 is subject to pressure by the action of gravity and the pressure of the overlying blanket of liquid and at each step in the panel 84 a portion of the liquid passes through the openings 91 to drop to the outlet collection sumps 89 below and thence to the outlet 90.

The solids collection sump 86 has on at least one side a backward sloping separation panel 87 fixed to the outlet side of the sump 86. This lower separation panel 87, is formed with a series of vertical or backward sloping solid segments 94 that provide a substantially solid face to solids in the sump 86, and a corresponding series of substantially horizontal openings 93 that allow the liquid and finer suspended solids to pass through the panel 87 under the action of water pressure, and thence to the outlet sump 89 and the outlet 90.

A solid deflection panel 88 may be located below the lower portion of the upper separation panel 84, sloping down from the top edge of the transition panel 85 to cover the lower separation panel 87. Liquid and finer suspended solids dropping down from the upper separation panel 84 are directed to the outlet collection sump 89 and thence to the outlet 90.

In another, similar, example of the invention, shown in FIG. 20, the solids collection sump 100 is divided into inlet and outlet sides by the lower separation panel 87 fixed at its lower edge to the outlet side of the sump 100 and inclined back at an angle towards to lower edge of the transition panel 85. The portion of liquid that reaches the sump 100 is forced by water pressure through the lower separation panel (formed with openings and solid segments as in the previous example), into the outlet side of the sump 100, over the lip 101 of the sump 100, into the outlet collection sump 89 and thence to the outlet 90. In all other ways this embodiment of the invention is the same as described in the previous embodiment.

Figure 22:
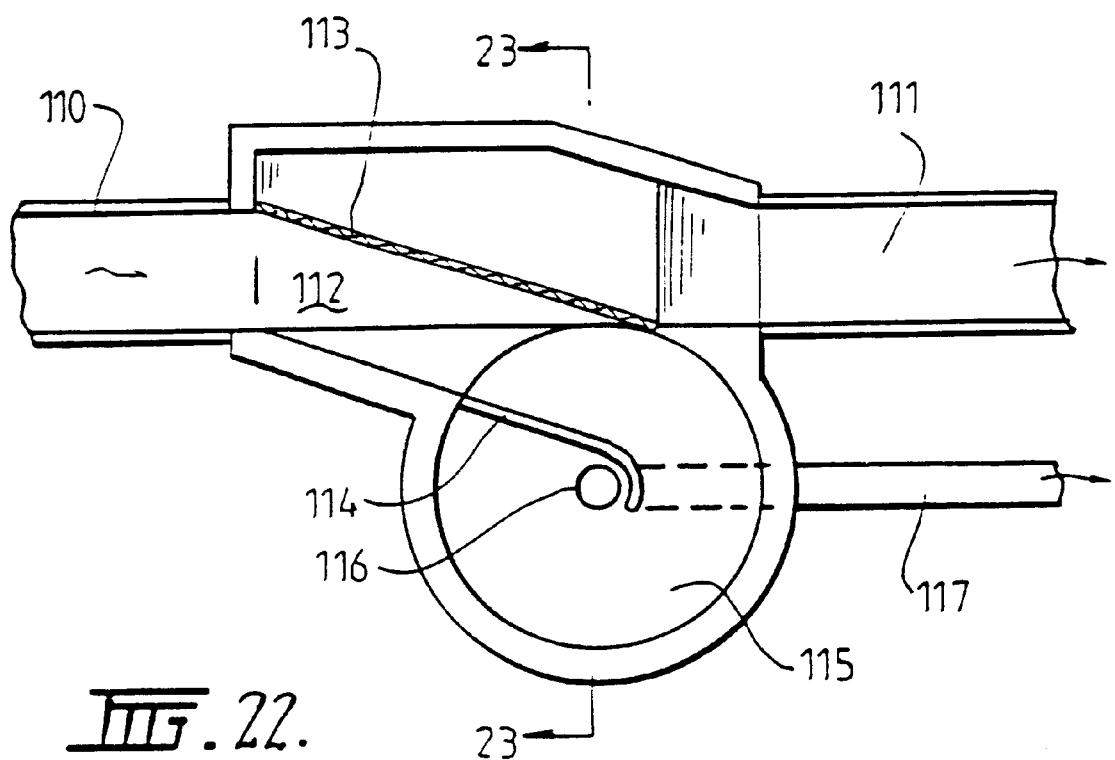
FIG. 22 shows a plan view of an arrangement using a separation plate of the invention, together with a dynamic separator whereby the volume of water relative to solid material can be restricted.
Figure 23:
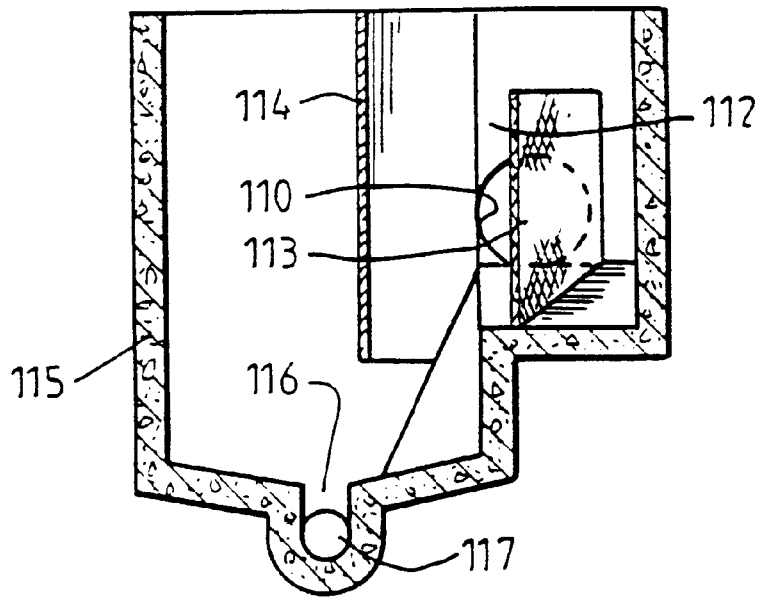
FIG. 23 shows a section along line 23—23 of FIG. 22.

The embodiment of FIGS. 22 and 23 show the use of the concept of the invention together with a dynamic separator. This embodiment can be particularly useful for a mixed system of sewage and stormwater. As previously mentioned, such systems normally carry the sewage load and this can be multiplied many times when there is, say a heavy storm. Sewage treatment plants may well not have the capacity to cope with the increased flow and there can be a loss of raw sewage and any stormwater carried debris.

In the embodiment, under normal conditions, the inlet 110 will carry sewage and any stormwater which will enter the chamber 112 and thence to the dynamic separator 115. In this the sewage and water will pass through aperture 116 to outlet 117.

Under conditions where there is greater flow, where there is substantial stormwater, then the liquid and entrained solids which come through the inlet 110 move along the separation plate 113 which acts as described in the previous embodiments, water will pass through the plate 113 whilst the entrained solids will be moved along the surface of the plate to the dynamic separator 115. Thus there is a restriction on the quantity of water which enters the dynamic separator. With this increased flow, too, there will be a build up of the solids adjacent the centre of the dynamic separator and these, together with the entrained water, will move to the centre, by vortex action, and will pass through the outlet 116. The remainder of the water will tend to be displaced by further incoming water, it will move about the baffle 114 and will tend to re-enter chamber 112.

The capacities of the chamber 112 and the dynamic separator 115 can be selected to enable the maximum outlet of the separator to be the maximum acceptable at the sewage treatment plant and the maximum throughput such as to enable the apparatus to cope with anticipated maximum flows.

Figure 24:
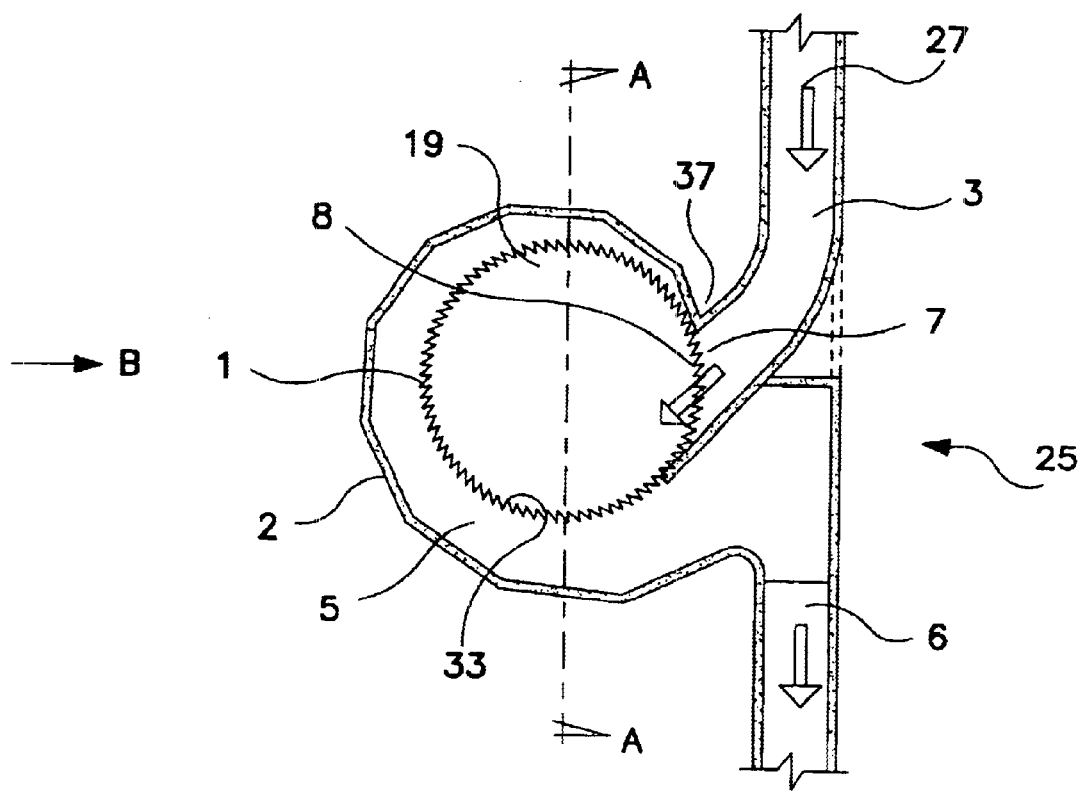
FIG. 24 is a plan view of a further example of a separator made in accordance with the invention.

FIG. 24 shows a plan view of an apparatus which could be used to separate solids from a flowing liquid, such as water (and particularly, storm water). The apparatus shown, generally denoted 25, includes a separation panel 1, which as depicted, is of a generally circular shape, when viewed in horizontal cross-section. When viewed in three dimensions (as shown more particularly in FIG. 25), it can be seen that the separation panel 1 has an open-ended generally cylindrical configuration.

Figure 25:
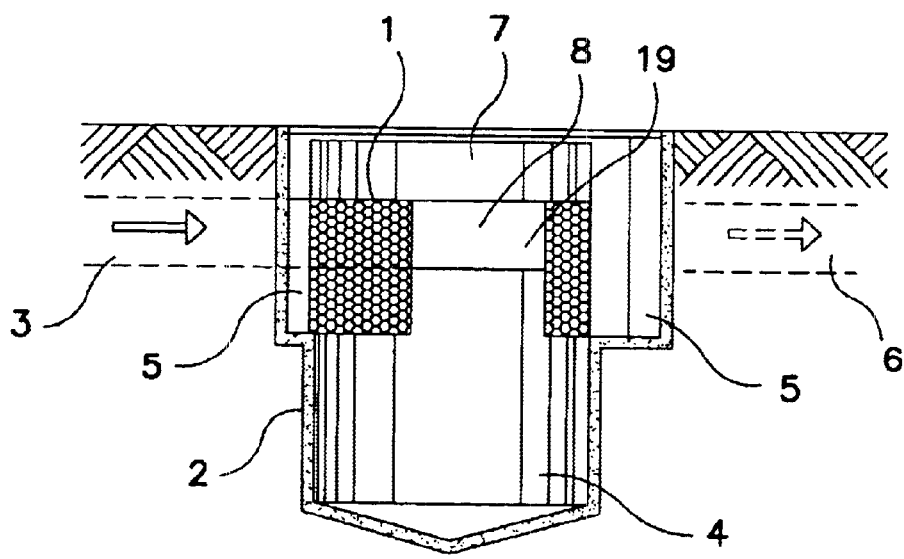
FIG. 25 represents a view (in the direction of the arrow marked "B" in FIG. 24") of a vertical section of the separator shown in FIG. 24, taken along the line A—A in that Figure.

As shown in FIGS. 24 and 25, the separation panel 1 is located within a separation chamber 2. The liquid enters the separation apparatus 25 via an inlet means 3, in the direction of the arrow 27 shown in FIG. 24. As shown in FIG. 24, the inlet channel 3 curves to the left until reaching the body 37 of the separator 25, where water and entrained solids or particulate matter are presented through an opening 8 into the interior 19 of the separation panel 1. The generally cylindrical configuration of the separation panel 1 is such that when the water leaves the opening 8 and enters the interior (or confines) 19 of the separation panel 1, a circular flow motion is established within the confines 19 of the separation panel 1, in the direction shown by the arrow 29 shown in FIG. 24.

Figure 26:
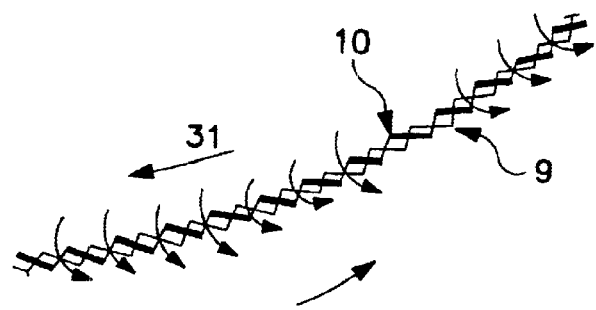
FIG. 26 shows an enlarged horizontal section of part of a separator panel for use in the invention.

Referring now to FIG. 26, it will be seen that the exemplary separation panel 1 depicted consists of a number of deflection means in the form of solid deflective segments 10 which generally present a closed face to the direction of flow of the liquid (as shown by the arrow numbered 31 in FIG. 26) within the separation panel 1. Behind each deflective segment 10 in the separation panel, there is an opening 9. As illustrated, each opening 9 is disposed at an angle to the direction of flow of the liquid in the separation panel 1. Moreover, the openings 9 are all of a predetermined size, which is such as to permit the passage only of particulate matter smaller in size than that of the openings. The liquid is of course, also able to pass freely through the openings. In use of the separation apparatus 25, the effect of this arrangement of features is that only the liquid, and solids or particulate matter of a size smaller than that of the openings 9 are able to pass through the separation panel. Solids or particulate matter of a larger size are therefore trapped within the confines 19 of the separation panel. Moreover, the circular motion of the liquid within the confines 19 of the separation panel means that trapped solids or particles are continuously deflected from the interior wall 33 of the separation panel. The net effect of this arrangement is therefore that the separation panel 1 is substantially self-cleaning.

Solids trapped within the confines 19 of the separation panel are therefore caused to continue moving by the circular flow until they settle under gravity, or, if floatable, are retained on the surface. At the same time, untrapped solids and the liquid are able to pass through the separation panel into the upper portion 5 of the separation chamber 2, and thence to the outlet means 6 (which, as shown in FIG. 24, may take the form of a channel, pipe or other suitable outlet structure).

As shown in FIG. 26, preferably, the flow of the liquid or gas outside the confines of the separation panel is in a direction opposite to the direction of its flow within the confines of the separation panel. This counter-current flow motion on opposite sides of the separation panel establishes a kinetic equilibrium which in turn facilitates the generally self-cleaning function of the circular flow motion established within the confines 19 of the separation panel.

Figure 27:
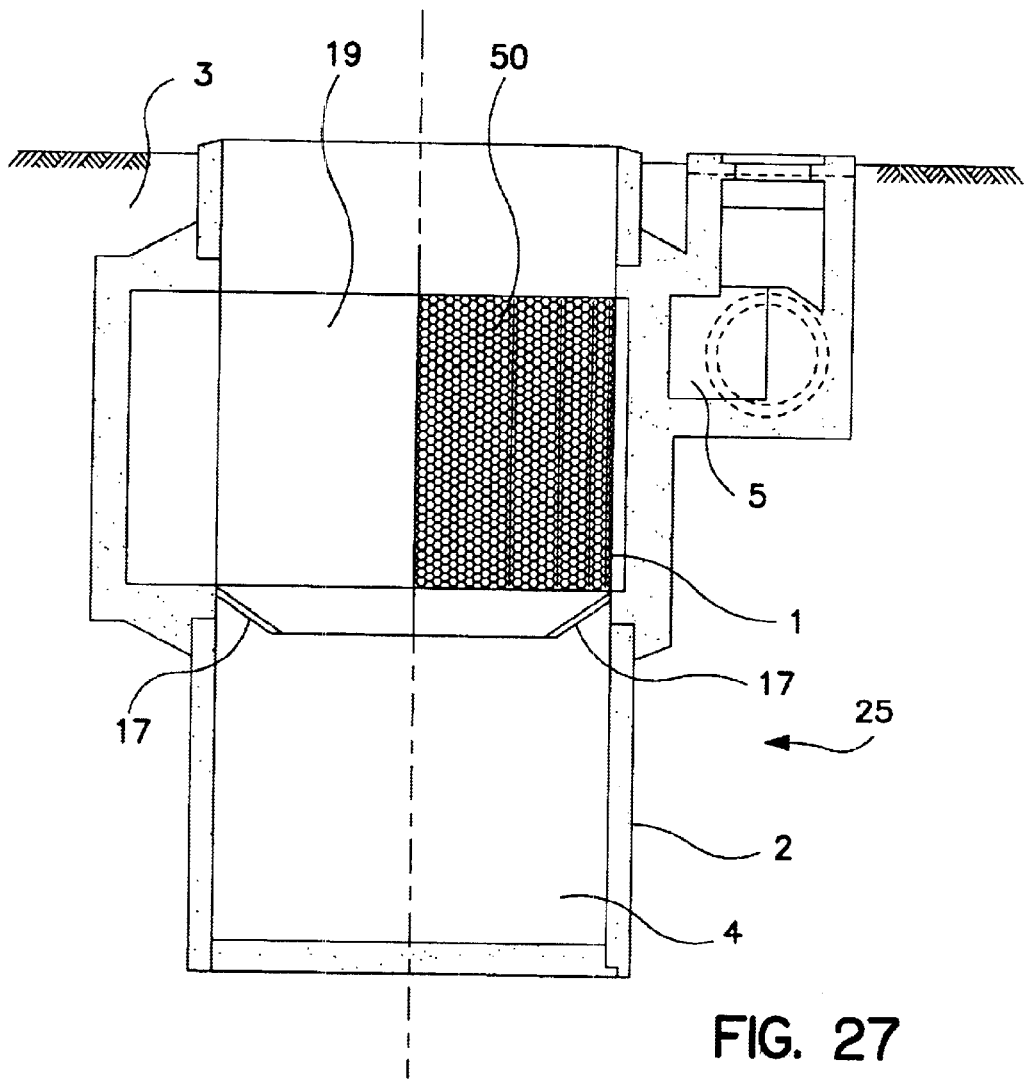
FIG. 27 is a view from the side of a vertical section through an exemplary separator made in accordance with the invention.

As shown in FIGS. 25 and 27, the separation apparatus 25 may also include a receptacle 4, such as a collection sump, for the containment (and removal, if desired) of settleable solids. The sump 4 may be sized or configured so as to slow down the circular flow of the liquid at the lower portion of the apparatus 25, so as to facilitate settlement of solids. The sump 4 may also be provided with any suitable means to facilitate the removal of settled solid or particulate matter. Such means could include, for example, periodic removal by education, or a mechanical bucket or basket that is suspended in the sump. Floatables which are left floating on the top of the body of water treated by the separation apparatus 25 could be removed by any convenient means.

As shown more particularly in FIG. 27, the separation apparatus may also include means for assisting the settlement of solids into the sump 4. The means shown in FIG. 27 take the form of a downwardly directed annular flange or baffle 17, which assists in directing downwardly moving solids into sump 4. The flange or baffle 17 also substantially prevents the circular motion of the liquid or gas within the upper regions of the separation chamber from being transferred into the sump 4.

Referring now to FIG. 25, as illustrated, the cylindrical separation panel 1 may be fitted with a continuation part 7 of the same material (or of another, generally impervious material) above the level of the normal inlet flow. This continuation part 7 ensures the retention of floating solids if the separation apparatus is subjected to head pressure (eg during flood conditions), if the apparatus is being used, for example, for the removal of litter from urban stormwater runoff.

Where particularly "purified" liquids or gases are required at the conclusion of the filiation procedure, it is possible for the outlet from one separation apparatus according to the invention to feed into the inlet for a second such separator, and therefore, for the liquid or gas to be filtered sequentially by two or more such separators, arranged in series. In such an arrangement, the size of the openings in the separation panels for the second and subsequent separators could be sequentially (and increasingly) smaller, so that each subsequent separator removes increasingly finer particles. Hence, by this arrangement, very high, or indeed, any desired level of filtration or purification could be achieved.

While much of the aforegoing description of the preferred embodiments has been concerned with apparatus for separating solids entrained in liquids it is to be understood that the invention is equally applicable to the separation of solids entrained in gases. Generally, for more efficient operation of gas/solid separators constructed in accordance with the invention, it would be necessary for the separator to be constructed as a sealed unit, so as to prevent the undesired escape of gases undergoing filtration. (This is a feature which could also be utilised in some liquid/solid separators constructed in accordance with the present invention). In this way, solid matter entrained in exhaust gases and gaseous emissions from various manufacturing plants, could be filtered in much the same way as solid-bearing liquids are treated, using the apparatus and methods of the present invention.

Those skilled in the art will therefore readily appreciate that the apparatus and methods of the present invention are capable of being put to many different uses, and that they embrace many modifications and variations. It is therefore also to be understood that the spirit and scope of the present invention is in no way limited to the particular details of the preferred embodiments described herein, but extends to, and is to be determined by reference to each novel feature and combination of features defined by the appended claims.

We claim:

1. An apparatus for separating solid or particulate matter from a liquid flowing through said apparatus in a direction of flow through said apparatus along a flow path from an inlet to an outlet, said apparatus comprising:
   a chamber member providing a chamber with an inlet and an outlet so that said chamber is configured to contain a volume of said liquid;
   a separation panel of expanded metal mesh positioned in said flow path of said liquid and positioned in said chamber so as to be at least partly submerged in said volume, said separation panel having a face along which said liquid passes in a predetermined direction, said separation panel having a plurality of openings of a predetermined size, with each opening having a dimension in any direction being substantially smaller than a panel dimension in that direction, said openings being disposed at an angle to said direction of flow of said liquid,
   wherein said separation panel has a plurality of protruding segments adjacent said openings, with each segment extending from said face of said panel at a position upstream of a respective one of the openings to project into said flow path to form a substantially closed face to said liquid flowing in said direction of flow such that liquid flowing through said openings will only contain solid or particulate matter smaller than said predetermined size and such that, in use, solid or particulate matter larger tan said predetermined size is substantially prevented from adhering to or obstructing said separation panel.

2. An apparatus according to claim 1, wherein said separation panel is generally flat.

3. An apparatus according to claim 2, wherein said separation panel extends generally horizontally transverse of said direction, and slopes downwardly in said direction.

4. An apparatus according to claim 1, wherein said separation panel is generally vertically oriented.

5. An apparatus according to claim 1, wherein said separation panel is arcuate such that said face is concave.

6. An apparatus according to claim 5, wherein said face is generally vertically oriented.

7. An apparatus according to claim 5, wherein said separation panel is arcuate so that said face is convex.

8. An apparatus according to claim 7, wherein said face is generally vertically oriented.

9. An apparatus according to claim 1, wherein said apertures face in a direction which has a direction component in said predetermined direction.

10. An apparatus as claimed in claim 1, wherein said apparatus additionally includes a flow diverter baffle disposed parallel to and spaced from said separation panel to allow recirculation of said liquid and contain floatables.

11. An apparatus as claimed in claim 10, wherein said apparatus includes a further baffle which extends from just below a top of said separation panel to a top of said flow diverter baffle and which acts to retain floatables.

12. An apparatus as claimed in claim 11, wherein said flow diverter baffle is a downwardly directed baffle.

13. An apparatus as claimed in claim 1, wherein said apparatus includes a receptacle for collecting said solid or particulate matter.

14. An apparatus as claimed in claim 13, wherein said apparatus additionally includes means for removing said solid or particulate matter from said receptacle.

15. An apparatus as claimed in claim 14, wherein said means for removing said solid or particulate matter from said receptacle include providing said receptacle with a removable container into which said solid or particulate matter may be received within said receptacle, in use of said apparatus.

16. An apparatus for separating solid or particulate matter from a liquid flowing through said apparatus in a direction of flow through said apparatus along a flow path from an inlet to an outlet, said apparatus comprising:
   a separation panel positioned in said flow path of said liquid, said separation panel having a face along which said liquid passes in a predetermined direction, said separation panel having a plurality of openings of a predetermined size, with each opening having a dimension in any direction being substantially smaller than a panel dimension in that direction, said openings being disposed at an angle to said direction of flow of said liquid,
   a flow diverter baffle disposed parallel to and spaced from said separation panel to allow recirculation of said liquid and contain floatables;
   wherein said separation panel has a plurality of protruding segments adjacent said openings, with each segment extending from said face of said panel at a position upstream of a respective one of the openings to project into said flow path to form a substantially closed face to said liquid flowing in said direction of flow such that liquid flowing through said openings will only contain solid or particulate matter smaller than said predetermined size and such that, in use, solid or particulate matter larger than said predetermined size is substantially prevented from adhering to or obstructing said separation panel.

17. An apparatus as claimed in claim 16, wherein said apparatus includes a further baffle which extends from just below a top of said separation panel to a top of said flow diverter baffle and which acts to retain floatables.

18. An apparatus as claimed in claim 17, wherein said flow diverter baffle is a downwardly directed baffle.

19. An apparatus as claimed in claim 16, wherein said apparatus includes a receptacle for collecting said solid or particulate matter.

20. An apparatus as claimed in claim 19, wherein said apparatus additionally includes means for removing said solid or particulate matter from said receptacle.

21. An apparatus as claimed in claim 20, wherein said means for removing said solid or particulate matter from said receptacle include providing said receptacle with a removable container into which said solid or particulate matter maybe received within said receptacle, in use of said apparatus.

22. An apparatus for separating solid or particulate matter from a liquid flowing through said apparatus in a direction of flow through said apparatus along a flow path from an inlet to an outlet, said apparatus comprising:

a separation panel positioned in said flow path of said liquid, said separation panel having a face along which said liquid passes in a predetermined direction, said separation panel having a plurality of openings of a predetermined size, with each opening having a dimension in any direction being substantially smaller than a panel dimension in that direction, said openings being disposed at an angle to said direction of flow of said liquid, a receptacle for collecting said solid or particulate matter;

wherein said separation panel has a plurality of protruding segments adjacent said openings, with each segment extending from said face of said panel at a position upstream of a respective one of the openings to project into said flow path to form a substantially closed face to said liquid flowing in said direction of flow such that liquid flowing through said openings will only contain solid or particulate matter smaller than said predetermined size and such that, in use, solid or particulate matter larger than said predetermined size is substantially prevented from adhering to or obstructing said separation panel.

23. An apparatus as claimed in claim 22, wherein said apparatus additionally includes a flow diverter baffle disposed parallel to and spaced from said separation panel to allow recirculation of said liquid and contain floatables.

24. An apparatus as claimed in claim 23, wherein said apparatus includes a further baffle which extends from just below a top of said separation panel to a top of said flow diverter baffle and which acts to retain floatables.

25. An apparatus as claimed in claim 24, wherein said flow diverter baffle is a downwardly directed baffle.

26. An apparatus as claimed in claim 22, wherein said apparatus additionally includes means for removing said solid or particulate matter from said receptacle.

27. An apparatus as claimed in claim 26, wherein said means for removing said solid or particulate matter from said receptacle include providing said receptacle with a removable container into which said solid or particulate matter may be received within said receptacle, in use of said apparatus.

* * * * *

UNITED STATES PATENT AND TRADEMARK OFFICE
CERTIFICATE OF CORRECTION

PATENT NO.     : 6,641,720 B1
DATED          : November 4, 2003
INVENTOR(S)    : Stephen Crompton et al.

It is certified that error appears in the above-identified patent and that said Letters Patent is hereby corrected as shown below:

<u>Title page,</u>
Item [56], References Cited, U.S. PATENT DOCUMENTS,
"1,699,828 A * 1/1929 Wycleoff" should read -- 1,699,828 A * 1/1929 Wyckoff --; and FOREIGN PATENT DOCUMENTS, "5918805 1/1984" should be deleted.

<u>Column 1,</u>
Line 41, "materials, one" should read -- materials. One --.

<u>Column 5,</u>
Line 30, "as" should read -- an --; and
Line 50, "form" should read -- from --.

<u>Column 6,</u>
Line 13, "OF" should read -- OF THE --; and
Line 28, "retrofitted" should read -- retro-fitted --.

<u>Column 8,</u>
Line 36, "maximise" should read -- maximize --;
Line 40, "87" should read -- 37 --; and
Line 41, "solids when" should read -- solids. When --.

<u>Column 9,</u>
Line 5, "become" should read -- becomes --;
Line 15, "homogenise" should read -- homogenize --;
Line 38, "though" should read -- through --;
Line 46, "centre" should read -- center --; and
Line 47, "be" should be deleted.

<u>Column 10,</u>
Line 47, "to" should read -- the --; and
Line 56, "show" should read -- shows --.

<u>Column 12,</u>
Line 51, "(eg" should read -- (e.g. --.

<u>Column 13,</u>
Line 32, "liquid;" should read -- liquid; and --.

UNITED STATES PATENT AND TRADEMARK OFFICE
CERTIFICATE OF CORRECTION

PATENT NO. : 6,641,720 B1
DATED : November 4, 2003
INVENTOR(S) : Stephen Crompton et al.

It is certified that error appears in the above-identified patent and that said Letters Patent is hereby corrected as shown below:

Column 14,
Line 40, "liquid," should read -- liquid; and --; and
Line 43, "floatables;" should read -- floatables, --.

Column 15,
Line 5, "maybe" should read -- may be --;
Line 19, "liquid," should read -- liquid; and --; and
Line 20, "matter;" should read -- matter, --.

Signed and Sealed this

Twenty-seventh Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,641,720 B1
DATED : November 4, 2003
INVENTOR(S) : Stephen Crompton et al.

It is certified that error appears in the above-identified patent and that said Letters Patent is hereby corrected as shown below:

Title page,
Item [30], Foreign Application Priority Data, insert -- Jun. 17, 1994 (AU) PM 6825 --.

Signed and Sealed this

Twenty-second Day of March, 2005

JON W. DUDAS
*Director of the United States Patent and Trademark Office*